United States Patent
Loughran

(10) Patent No.: US 9,743,461 B1
(45) Date of Patent: Aug. 22, 2017

(54) SYSTEM AND METHOD FOR DYNAMIC DEPLOYABLE WIRELESS SERVICES

(71) Applicant: Kevin Loughran, Denville, NJ (US)

(72) Inventor: Kevin Loughran, Denville, NJ (US)

(*) Notice: Subject to any disclaimer, the term of this patent is extended or adjusted under 35 U.S.C. 154(b) by 0 days.

(21) Appl. No.: 15/335,438

(22) Filed: Oct. 27, 2016

Related U.S. Application Data

(60) Provisional application No. 62/317,421, filed on Apr. 1, 2016.

(51) Int. Cl.
| | | |
|---|---|---|
| *G05D 1/10* | (2006.01) | |
| *H04W 84/18* | (2009.01) | |
| *H04W 84/06* | (2009.01) | |
| *H04W 84/00* | (2009.01) | |
| *H04W 76/02* | (2009.01) | |
| *H04W 28/02* | (2009.01) | |
| *H04W 16/28* | (2009.01) | |

(52) U.S. Cl.
CPC ......... *H04W 84/18* (2013.01); *H04W 28/021* (2013.01); *H04W 76/028* (2013.01); *H04W 84/005* (2013.01); *H04W 84/06* (2013.01); *G05D 1/104* (2013.01); *H04W 16/28* (2013.01)

(58) Field of Classification Search
CPC ... H04W 84/18; H04W 28/021; H04W 16/28; H04K 3/68; H04K 2203/18; H04K 2203/34; G05D 1/10; G05D 1/104; G05D 2201/0207
See application file for complete search history.

(56) References Cited

U.S. PATENT DOCUMENTS

| | | | | |
|---|---|---|---|---|
| 8,140,658 B1* | 3/2012 | Gelvin | .................... | H04L 67/12 709/224 |
| 8,194,573 B1* | 6/2012 | Smith | .................... | H04W 8/005 370/255 |
| 9,131,529 B1* | 9/2015 | Ayyagari | .............. | H04W 84/06 |
| 2004/0030449 A1* | 2/2004 | Solomon | ............... | B64C 39/024 700/245 |
| 2007/0299947 A1* | 12/2007 | El-Damhougy | .... | H04W 76/028 709/223 |
| 2009/0168703 A1* | 7/2009 | Pandey | ................. | H04W 8/005 370/329 |
| 2014/0105054 A1* | 4/2014 | Sægrov | ................ | H01Q 3/2605 370/252 |
| 2015/0173034 A1* | 6/2015 | Rode | ................... | H04W 56/001 370/330 |

* cited by examiner

*Primary Examiner* — Dale Moyer
(74) *Attorney, Agent, or Firm* — Marin Patents LP; Gustavo Marin

(57) ABSTRACT

A system and method for intelligently and dynamically deploying a plurality of mobile robotic machines capable of carrying out a complex series of actions automatically to propagate wireless network connectivity comprising, at least, a mechanical framework, sensors, actuators, communications capability, an energy source, a propulsion means, a control mechanism, and a payload. The payload may comprise electronic or mechanical communication equipment to propagate services such as wireless networking services, in for example, a first responder or emergency environment, or electronic and mechanical jamming services in a military or anti-terrorism environment.

18 Claims, 13 Drawing Sheets

SYSTEM AND METHOD FOR DYNAMIC DEPLOYABLE WIRELESS SERVICES

CROSS-REFERENCE TO RELATED APPLICATIONS

This application claims the benefit of and priority to U.S. provisional patent application Ser. No. 62/317,421 filed Apr. 1, 2016, entitled "SYSTEM AND METHOD FOR DYNAMIC DEPLOYABLE WIRELESS SERVICES" the entire contents of which are hereby incorporated herein by reference in their entirety.

BACKGROUND OF THE INVENTION

Field of the Art

The disclosure relates to the field of robotics, and more particularly to the field of robotic automation and of robotic cooperation.

Discussion of the State of the Art

In systems known in the art, a wireless base station is deployed to provide wireless network service. This wireless base station has wireless transmitters and receivers which are fixed in place, often mechanically. Although some more advanced wireless base stations provide capability to mechanically adjust the position of the transmit and receive elements, the position of the wireless base station is fixed, and adjustment of the transmit and receive elements is limited.

The wireless base station is connected to a central point station, typically utilizing wired backhaul transport. The location and functionality of the central point station varies depending on the type or generation of wireless network service, and is not a critical point of concern in the context of this disclosure.

Variants of the prior art may include:
Wireless backhaul for connecting the wireless base station to the central point station
Multiple transmit and receive elements in the wireless base station
Capability to point or mechanically steer the transmit and receive elements of the wireless base station
In all cases of the prior art, the wireless base station is not dynamically deployable.

What is needed is a system and method for intelligently and dynamically deploying a plurality of mobile robotic machines capable of carrying out a complex series of actions automatically to propagate wireless network connectivity.

SUMMARY OF THE INVENTION

Accordingly, the inventor has conceived and reduced to practice, in a preferred embodiment of the invention, a system and method for rapid deployment of wireless networks.

According to a preferred embodiment of the invention, applications of wireless robots are well known and encompass ground based, aerial, as well as undersea instantiations of robotic machines. The nature of wireless robots enables them to operate without fixed means for communications or power, and prior art has shown these machines remotely controlled, and in some cases even capable of autonomous operation.

In a preferred embodiment of the invention, a unique combination of teams of wireless robots, coupled together with elements of communications systems, are able to provide capabilities and services, which were not possible with systems known in the art.

More specifically, this novel system exploits the miniaturization of wireless robots working together in teams, coupled with the miniaturization and partitioning of the elements of communications systems, such as wireless transmitters and receivers. A system employing this innovative approach will exhibit the following advantageous characteristics:
Ability to deploy wireless services (for example wireless network services) dynamically
Such wireless services can be deployed extremely fast
Can be deployed in areas previously not possible such as hazardous environments and/or remote areas
Advanced configurations and services can be implemented, which were previously not possible

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

Figure 5:
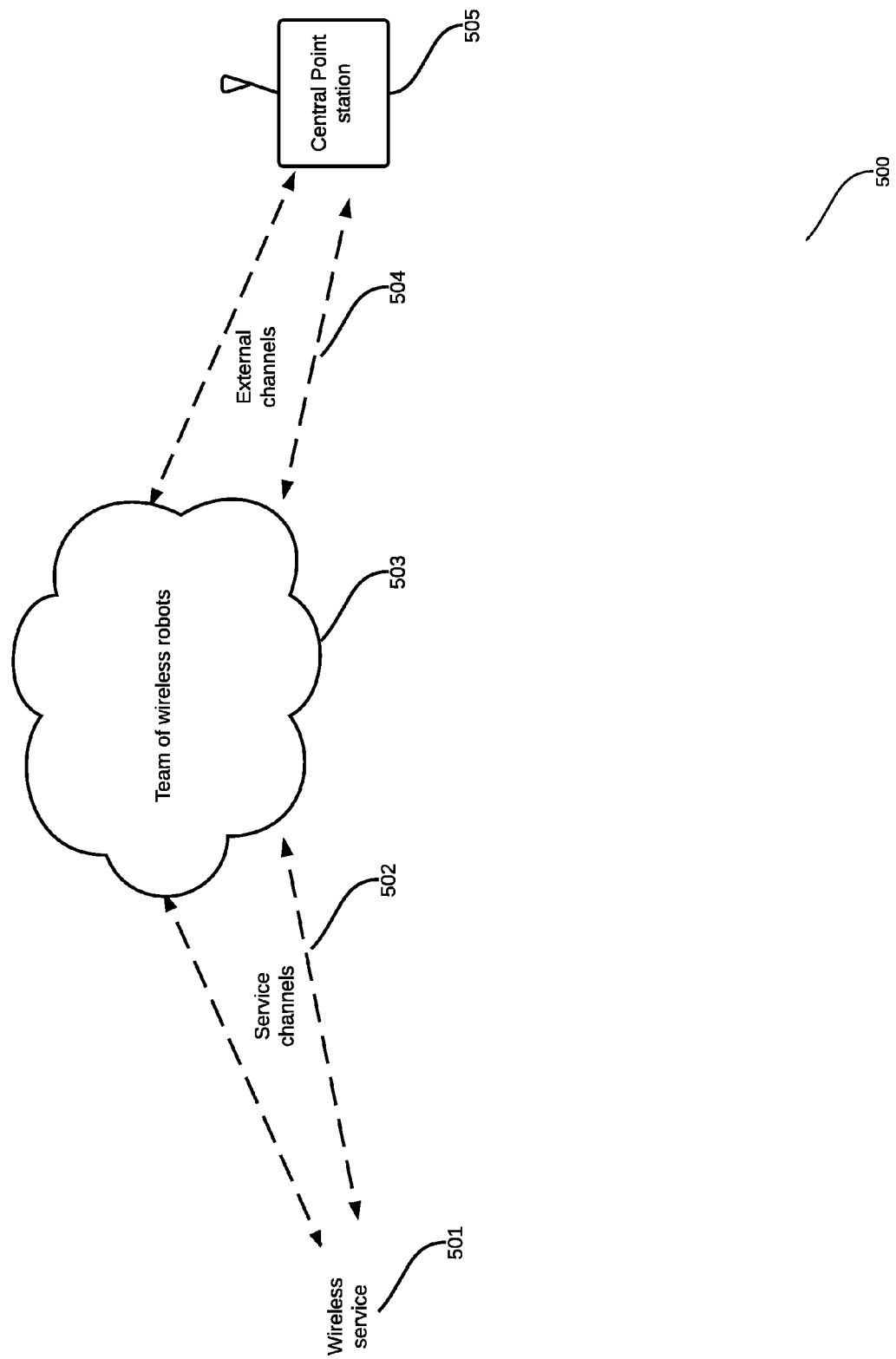

FIG. 5 an exemplary high-level architecture of a preferred embodiment of the invention.

Figure 6:
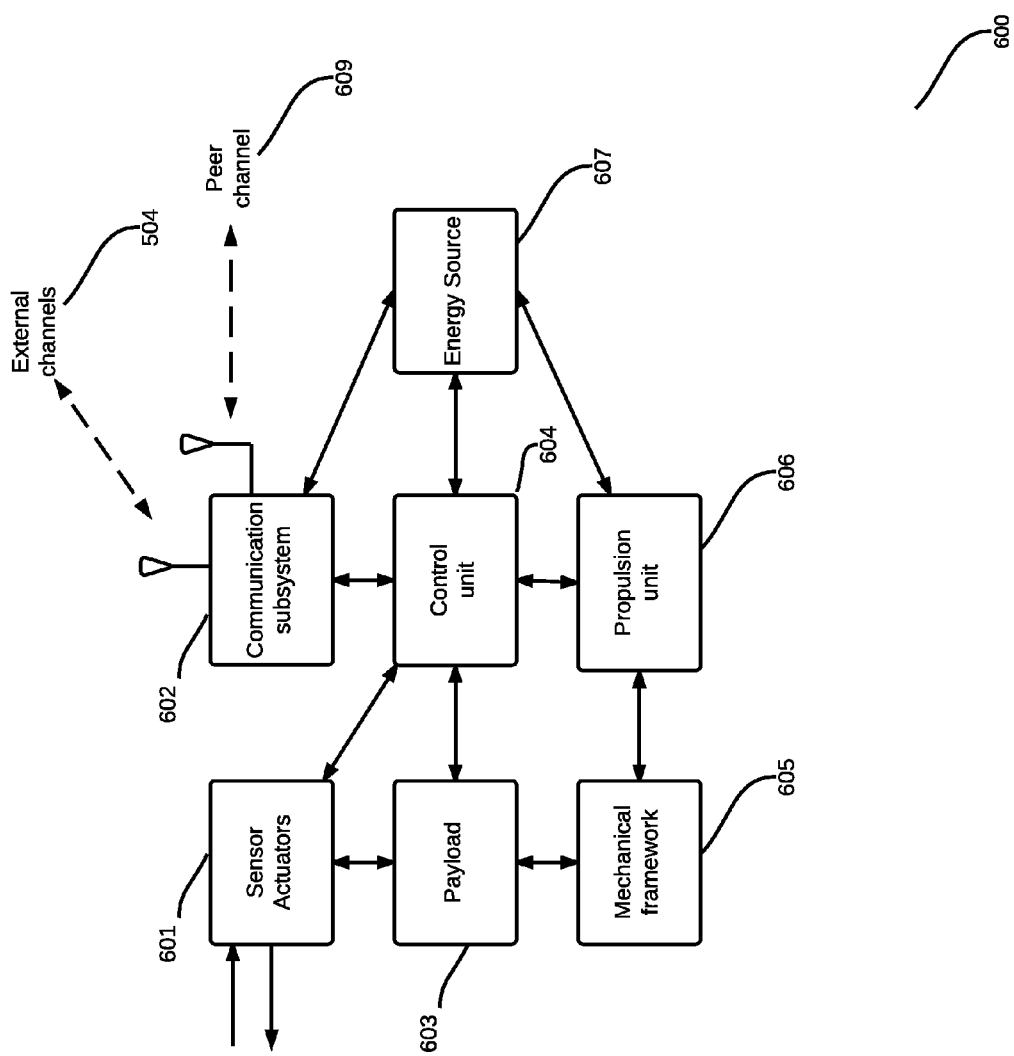

FIG. 6 is an exemplary wireless robot system illustrating functional elements, according to a preferred embodiment of the invention.

Figure 7:
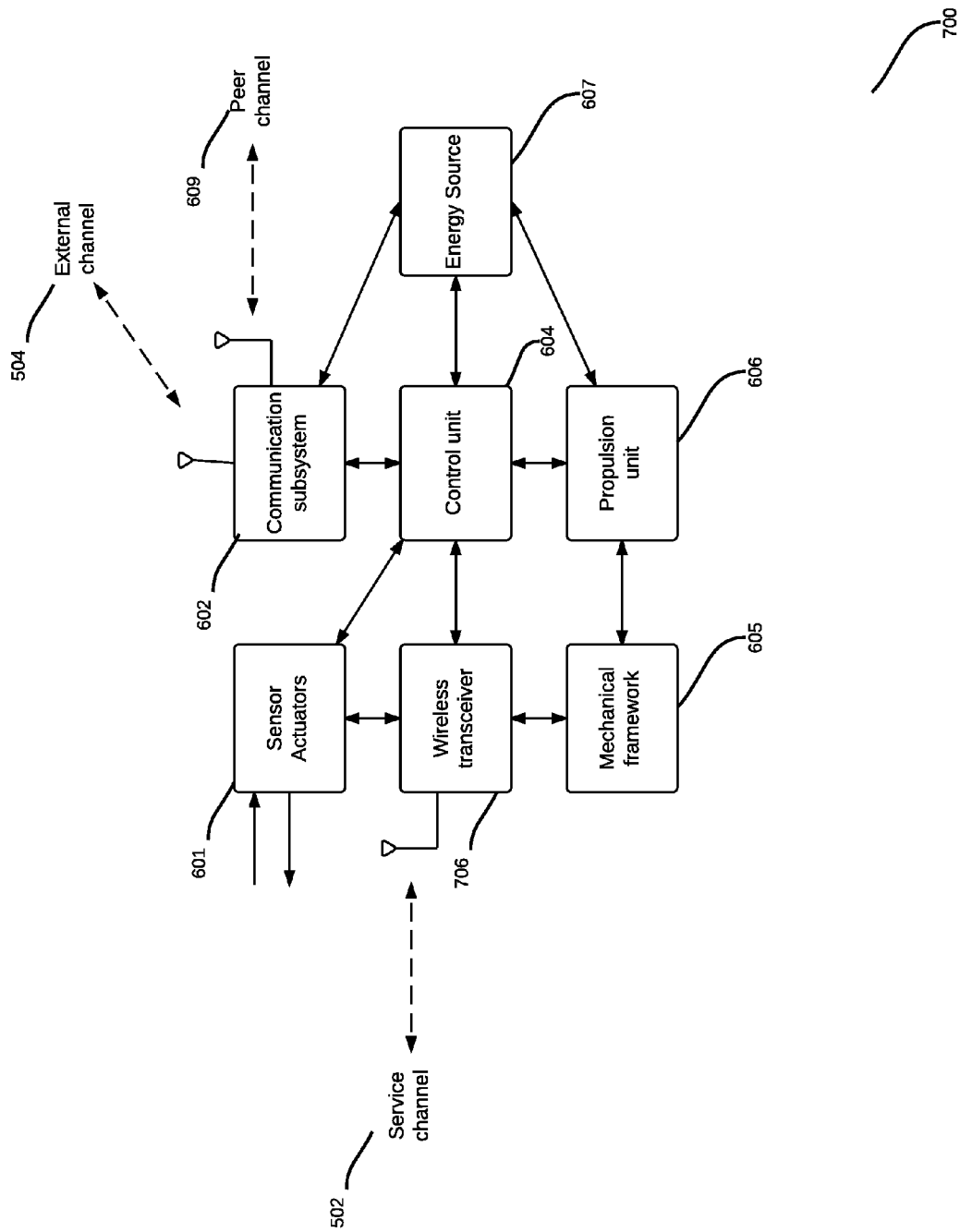

FIG. 7 is an exemplary embodiment of a wireless robot system employing a wireless transceiver, according to a preferred embodiment of the invention.

Figure 8:
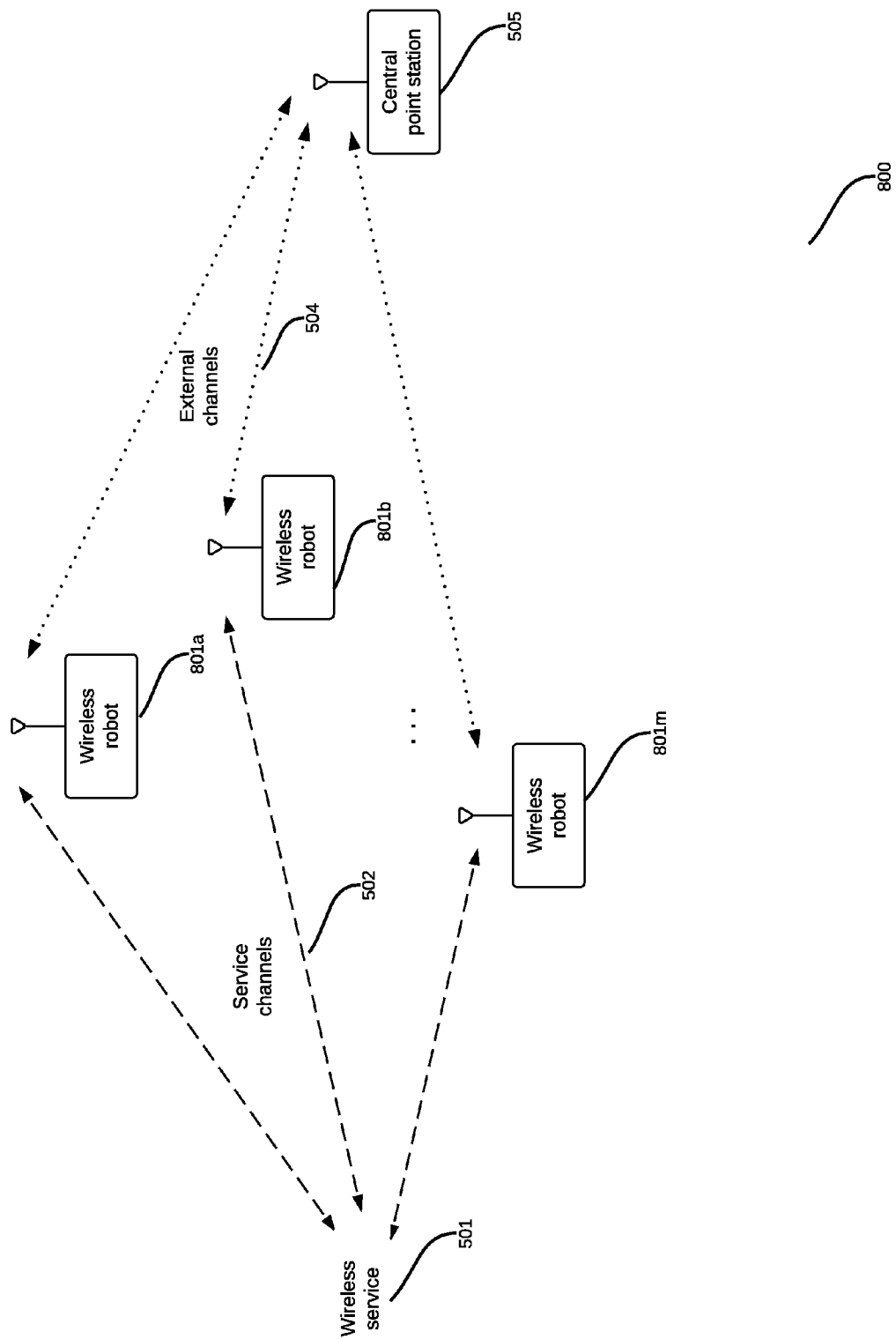

FIG. 8 is an exemplary embodiment of a wireless robot system illustrating cooperation between a plurality of robots, according to a preferred embodiment of the invention.

Figure 9:
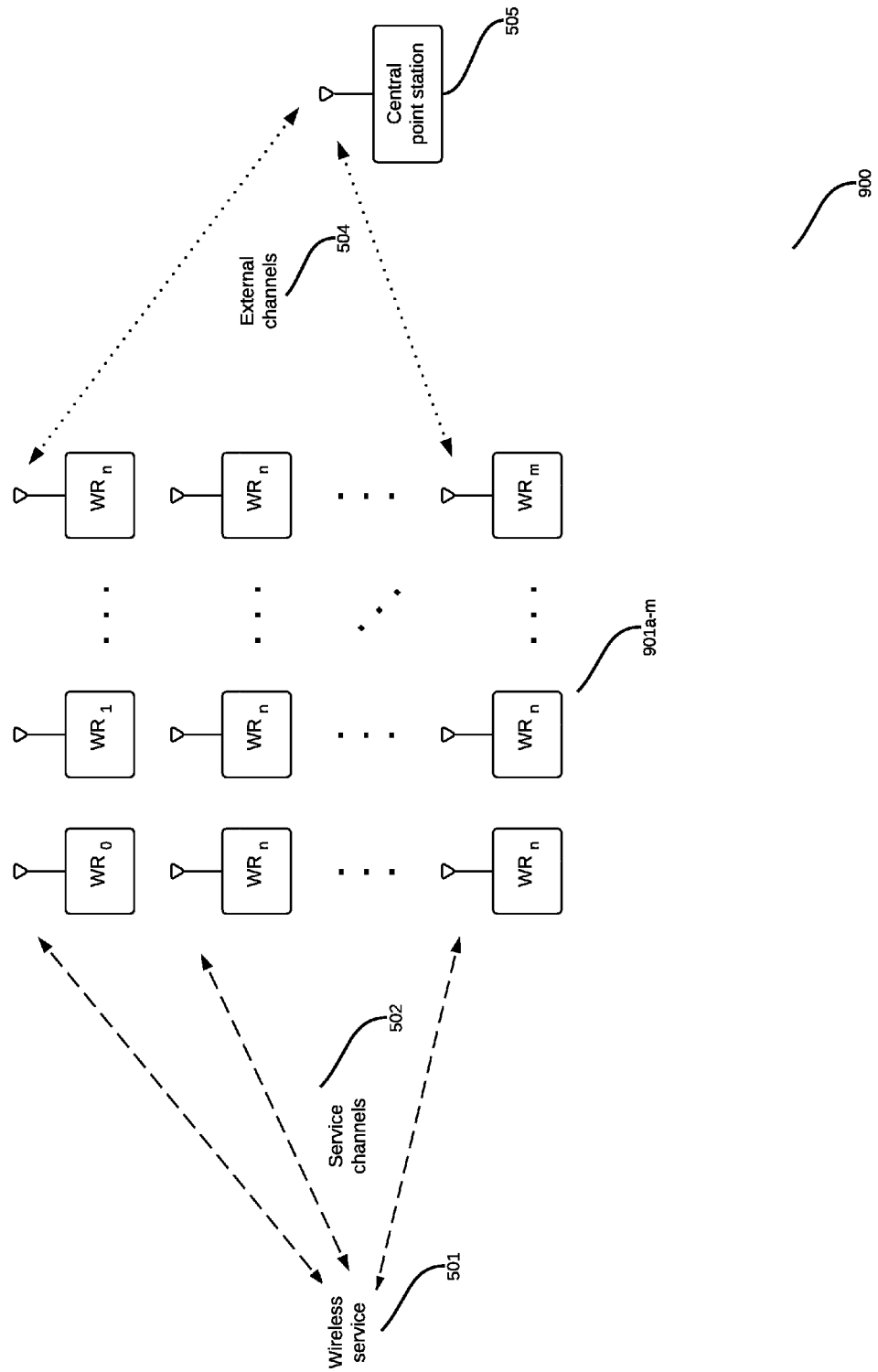

FIG. 9 is an exemplary embodiment of a team of wireless robots illustrating a communication array for collaboration between team members to provide wireless services, according to a preferred embodiment of the invention.

Figure 10:
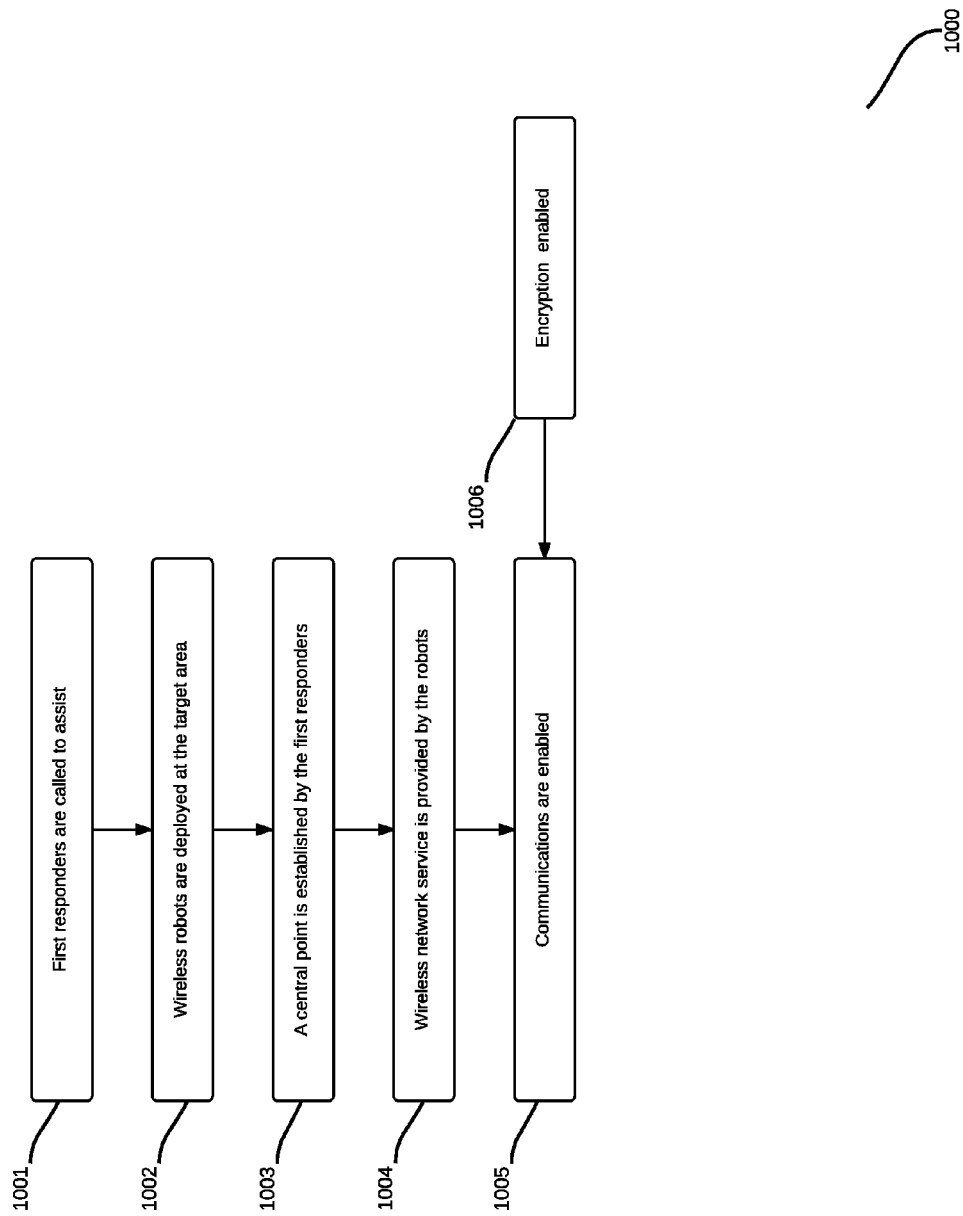

FIG. 10 is an exemplary embodiment of a wireless robots deployed in a first responder scenario.

Figure 11:
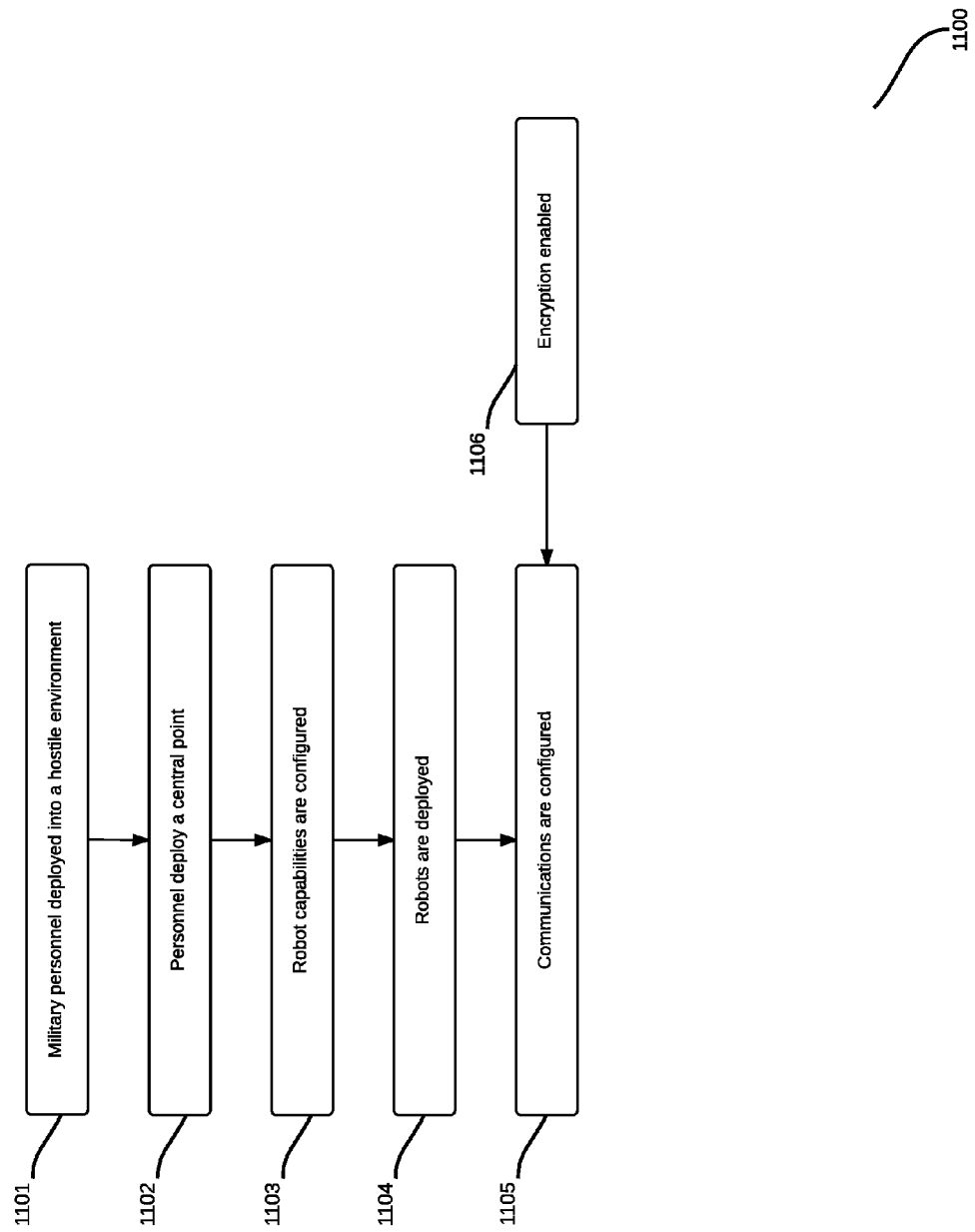

FIG. 11 is an exemplary embodiment of a wireless robots deployed in a military battlefield scenario.

Figure 12:
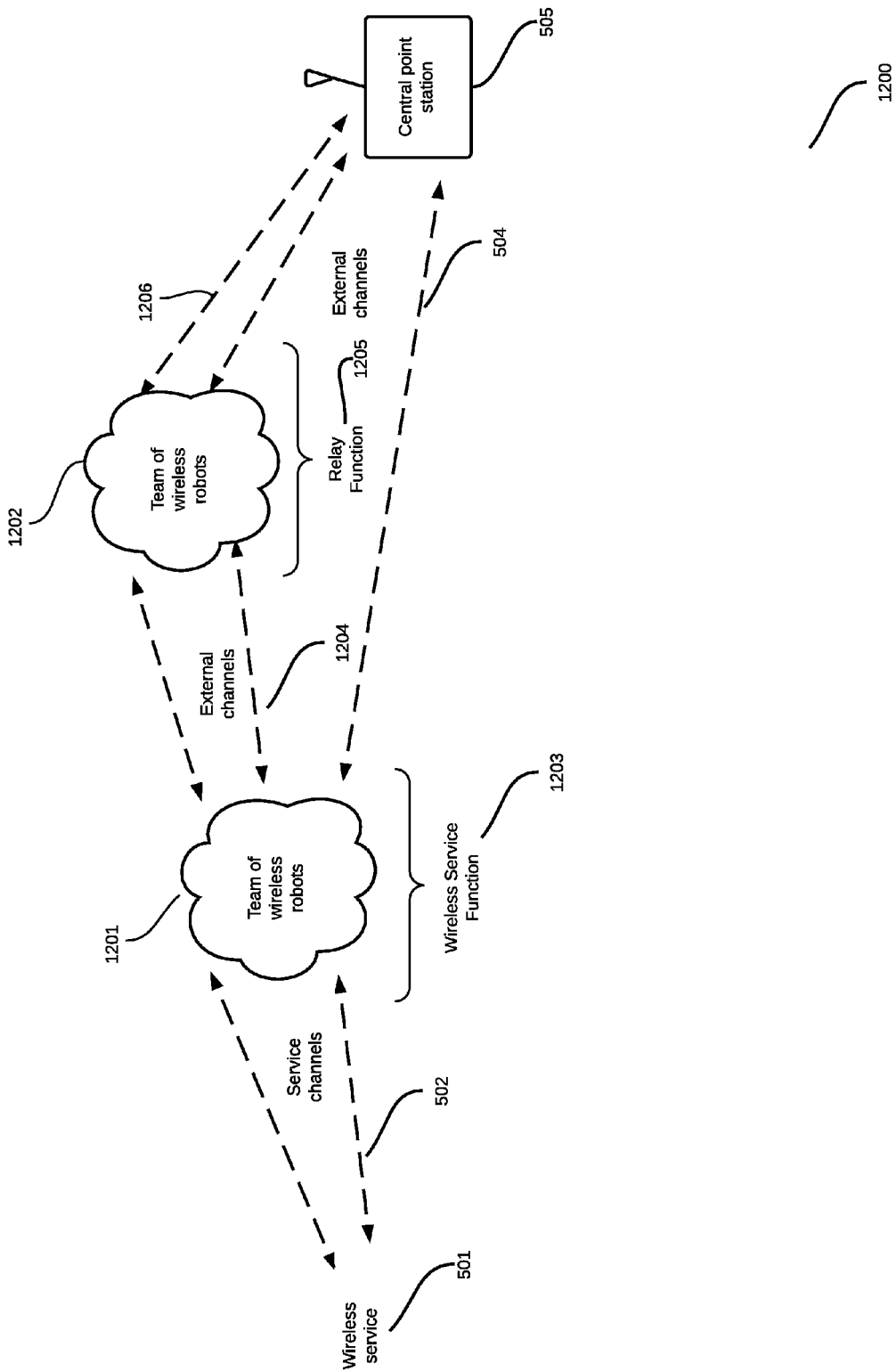

FIG. 12 is an exemplary method illustrating propagation of deployable entities according to a preferred embodiment of the invention.

Figure 13:
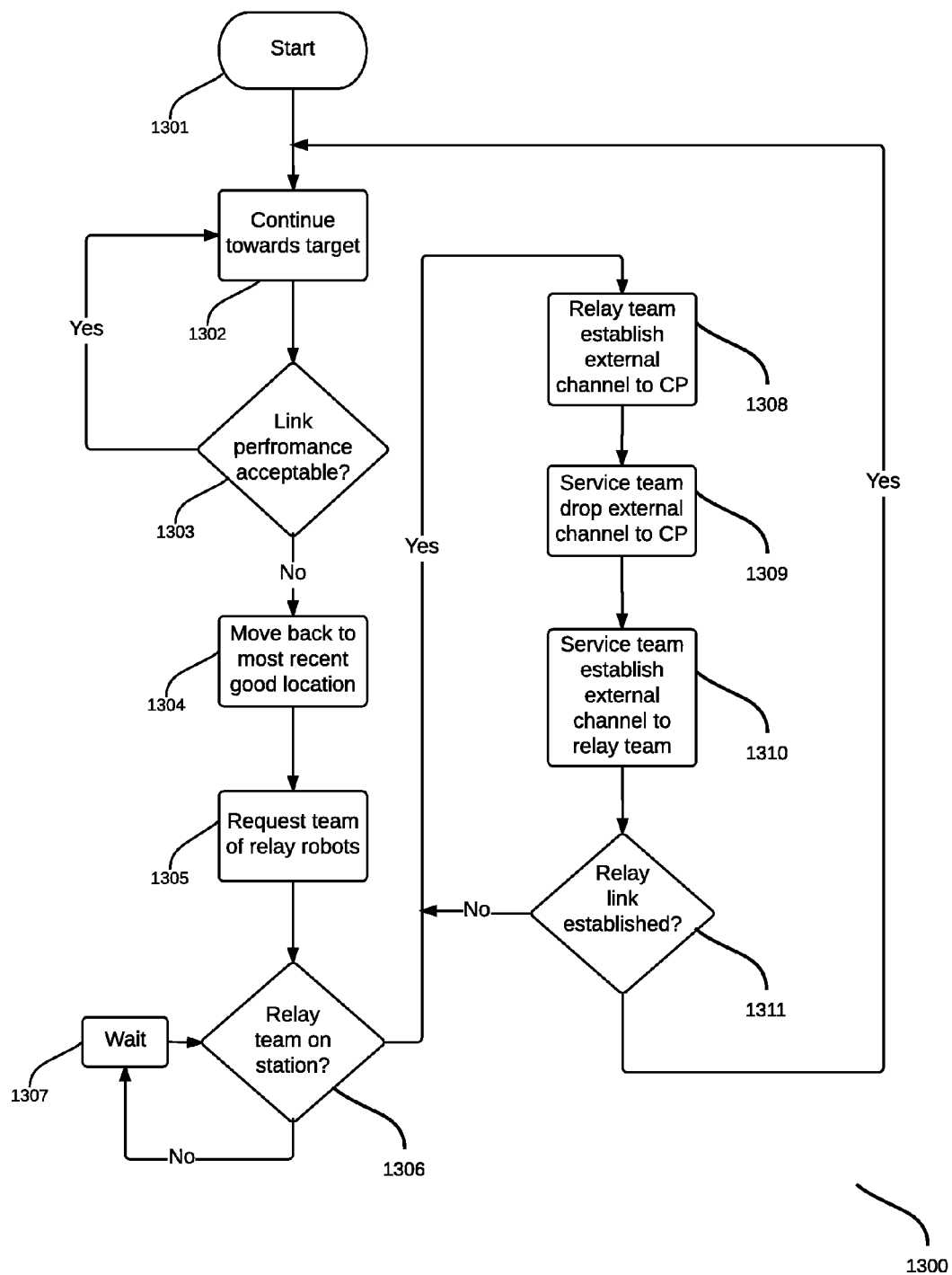

FIG. 13 is an exemplary method illustrating management of a deployment of a team of wireless robots providing relay functionality.

DETAILED DESCRIPTION

The inventor has conceived, and reduced to practice, a system and method for rapid and dynamic deployment of wireless networks.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
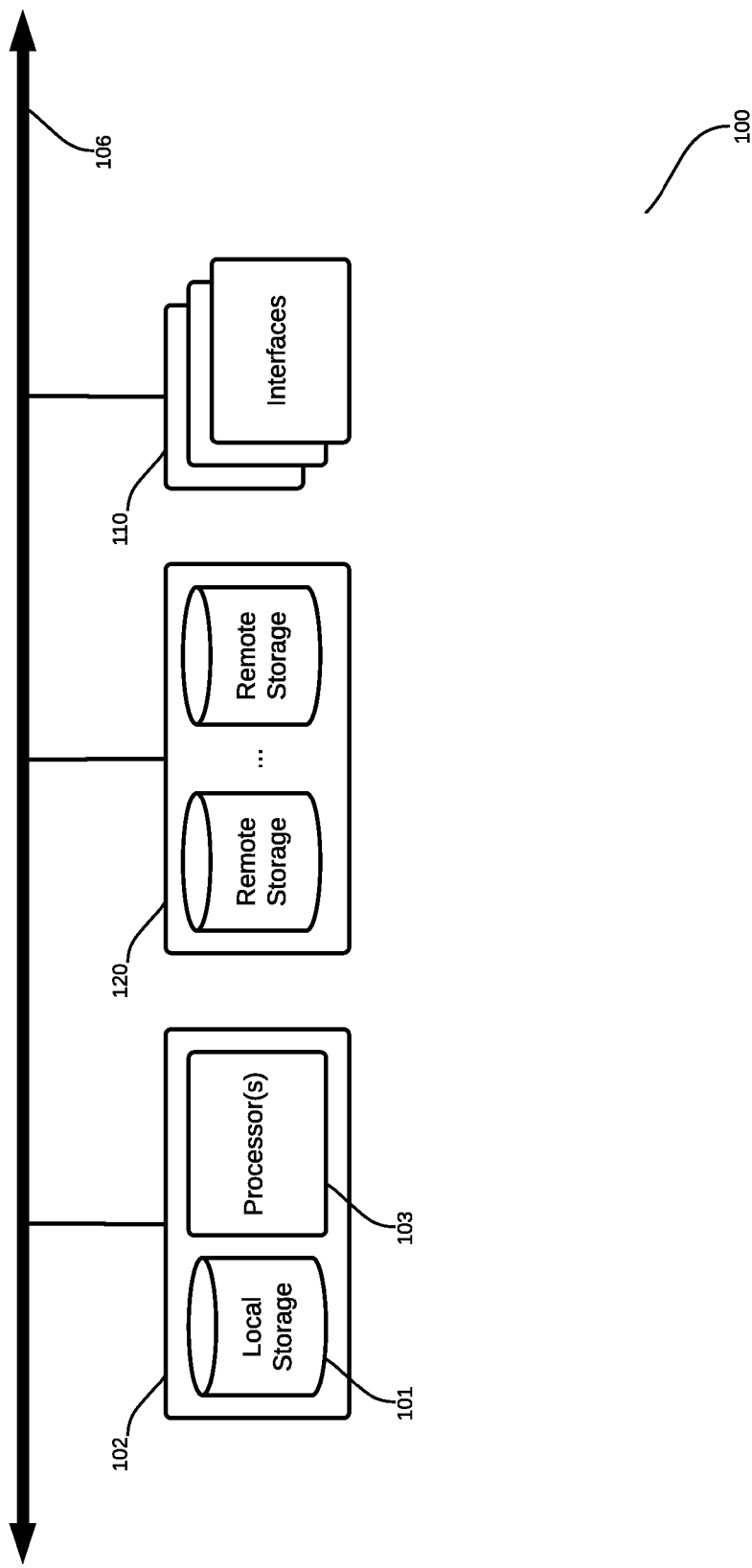
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON' or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT', PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
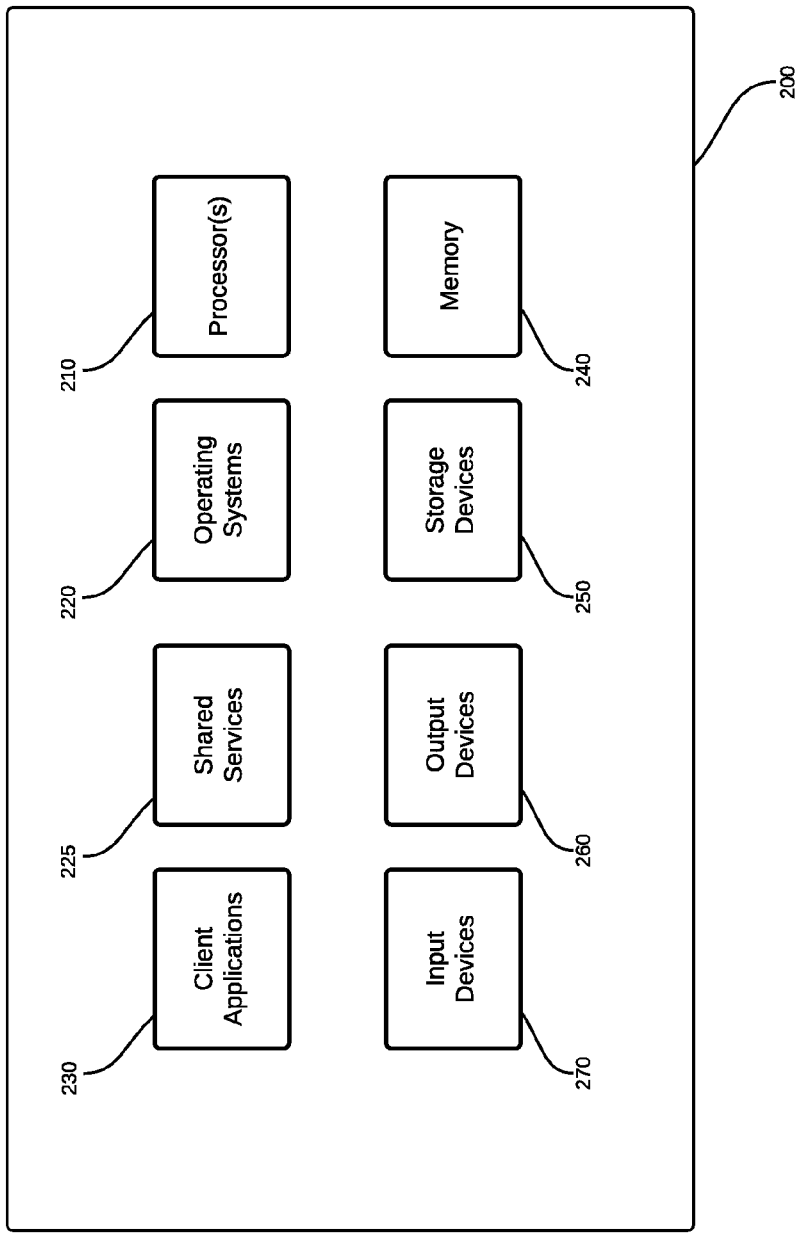
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS' operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS' services, userspace common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
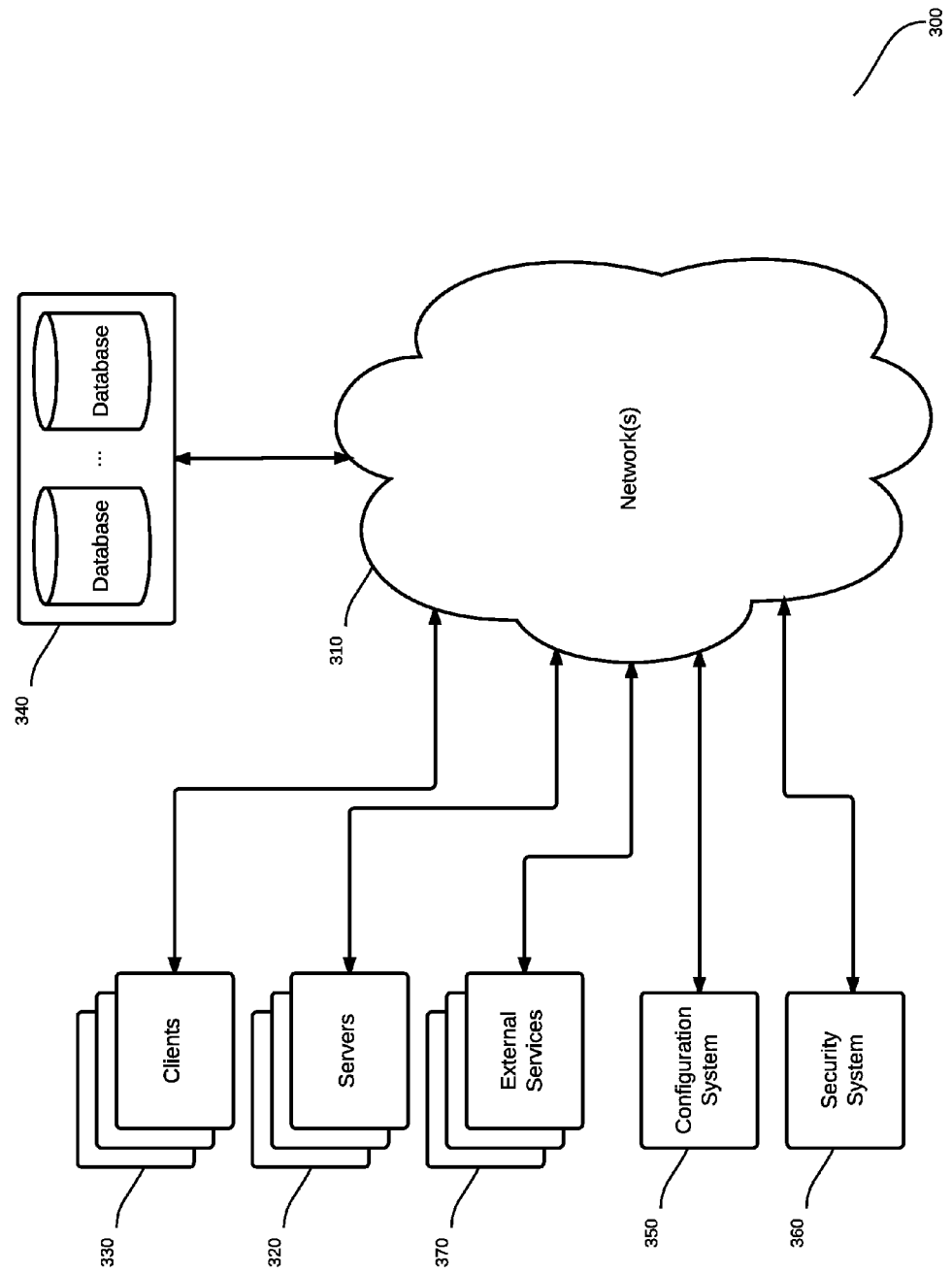
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
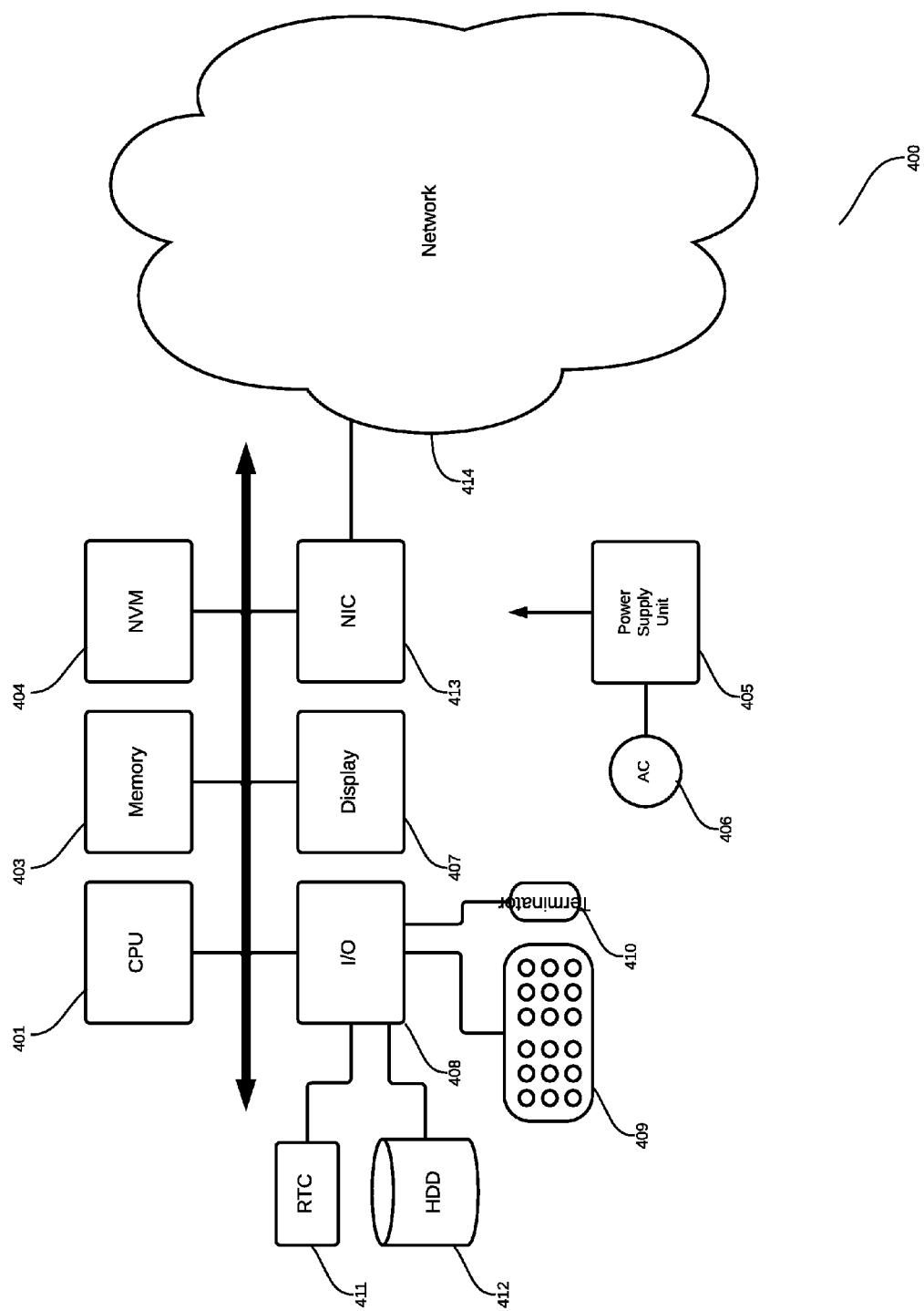
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 5 is an exemplary high-level architecture of a preferred embodiment of the invention. According to the embodiment, a team of wireless robots 503 provides wireless network service 501. This wireless network service is provided to the user by the use of service channels 502, as shown in FIG. 5. Further, being wireless, connectivity to the central point station 505 is by necessity wireless, the team of robots employing external channels 504 to implement, at least, a wireless backhaul to the central point station 505.

The plurality of wireless robots 503 that comprise the team may be aerial, ground-based, water-based, and the like, or any combination thereof. In most embodiments, the plurality of wireless robots 503 include a plurality of wireless robots acting cooperatively.

A wireless robot system 600 is depicted in FIG. 6. Functional elements such as mechanical framework 605, propulsion subsystem 606, and often times payload 603, comprise elements of a wireless robot, and as can be appreciated by one with skill in the art, the instantiation of these elements may be different depending on whether the robot's operating environment is on land, in the air, underground, in the water, or some combination thereof. Propulsion subsystem 606 comprises a source of mechanical power, and means of converting this power into propulsive force that may include, but is not limited to, a propeller system, a combustion or electric engine, a turbine, etc. In some embodiments propulsion subsystem 606 comprises a technological system that uses an engine or motor as the power source, and wheels and axles, propellers, or a propulsive nozzle to generate force. In some embodiments components such as clutches or gearboxes may be added to connect the motor to axles, wheels, or propellers. In other embodiments propulsion subsystem 606 may be driven by balloons (for example whereby lift is generated by helium, hydrogen or some other gas), gliders that may provide lift from a wing arrangement, and other non-motorized methods.

Further shown in FIG. 6 is a control unit 604 for coordinating the various elements of the robot, optional sensors and actuators 601, depending on the operational task of the robot. Sensors 601 may include, but not limited to, optical sensors, video capture devices, atmospheric sensors, carbon dioxide sensors, smoke detectors, radio frequency sensors, or other specialized sensors, or any combination thereof. Actuators 601 may include, but not limited to, levers, mechanical arms, weapons, water delivery means, motor-driven actuators, hydraulic actuators, piston actuators, and the like.

Energy source 607 for providing power to the various other elements in the robot system. Energy source 607 may include, but not limited to, electrical, battery hydrogen fuel cell, solar cell, generator, wind turbine, nuclear generator, compressed air, and the like. In some embodiments the control unit 604 continuously stores location information to a location database 101 (or database 120). In addition, various other information is stored that may be associated to location including, but not limited to, connection performance at the particular location. In some embodiments a last known good location is stored in database 101. In some embodiments, a prioritized list of good locations is stored in database 101. Whereby a good location is defined as a location where an acceptable performance of connection to central point station 505 is at a certain pre-configured level. In some embodiments, a pre-configured level may be dynamic and change due to conditions, for example, environmental conditions or operating conditions. Other information including environmental information such as temperature, pressure, air quality, and the like may be stored and associated to location. In some embodiments historical information may be stored by control unit 604 including, but not limited to, communication from communication subsystem 602.

Finally shown in FIG. 6, is communication subsystem 602 enabling the robot to communicate wirelessly to other robots or devices, using a variety of wireless communication methods (for example, WiFi™, Cellular, short-range interconnected device protocol, and the like) as described previously. Communication subsystem 602 may include a means for communicating with external channel 504, for transporting various types of information (as outlined previously) between a robot and central point station 505. Communication subsystem 602 may also include, optionally, a means for communicating with peer channel 609, which may facilitate information transport such as, location info, relative position, system status, information form external channels, info form service channels, info form sensors, information to actuators between other robots working within that team. One skilled in the art may also appreciate where optionally, the means for communicating with external channel 504, and for communicating with peer channel 609 may be embodied within the same equipment or device.

FIG. 7 is an exemplary embodiment of a wireless robot system employing a wireless transceiver, according to a preferred embodiment of the invention. According to the embodiment, payload 603 may comprise a wireless transceiver 706 that may include, but not limited to, a combination transmitter/receiver in for example, a single package to provide wireless communications services on various protocols and platforms, for example, cellular, WiFi, RF, Bluetooth, mobile two-way radios, and the like to provide service channel 502 thereby establishing wireless service 501.

FIG. 8 is an exemplary embodiment of a wireless robot system illustrating cooperation between a plurality of robots, according to a preferred embodiment of the invention. According to the embodiment, a more detailed view of a team of "m" wireless robots 801*a-m* working cooperatively to provide wireless network service is shown. As shown in FIG. 7, and as can be seen in FIG. 8, each of the "m" wireless robots 801*a-m* are capable of utilizing one or more external channels 504 for communication to central point station 505. Further, each of the "m" wireless robots 801*a-m* are capable of employing service channels 502 to provide wireless network service 501 utilizing a plurality of wireless transceivers 706.

One skilled in the art may appreciate, per FIGS. 6 and 7, that each of the "m" wireless robots are capable of communicating with one another utilizing peer channels 609. Peer channels 609 communication is omitted from FIG. 8 for clarity.

Referring again to FIG. 8, one skilled in the art may appreciate a system whereby a subset of the "m" wireless robots 801*a-m* may be in communication with central point station 505 utilizing external channels 504, and whereby another subset of wireless robots 801*a-m* might not. Such advanced configurations are treated elsewhere.

FIG. 9 depicts a team of wireless robots 901*a-m* collaborating in an array formation to provide wireless network service 501. Such an array formation might be recognizable to those skilled in the art as a means to provide beamforming capability, which in some cases has advantageous characteristics for providing wireless services 501. According to the embodiment, the team of wireless robots 901*a-n* may be deployed with an appropriate number of spare wireless robots 901*a-m* providing an m+n redundancy capability. In the case where one or more of the wireless robots 901*a-n* providing wireless network service or jamming signals were damaged or destroyed by the military action, one or more spare wireless robots 901*a-m* would join the team of active wireless robots to replace those that may have been lost.

Further according to the embodiment, the wireless robots would be deployed in an array structure to enable beamforming. The beamforming would enhance security and effectiveness by focusing the energy of the wireless network service where appropriate. Energy for wireless network service would be focused in areas where friendly units are operating, and energy for jamming signals would be focused in areas where enemy units are operating. One skilled in the art can understand how the gain and phase of the signals processed in the wireless transceiver of each wireless robot could be adjusted to form said directional beams. For example, to implement a technique for directional signal transmission or reception (or both) whereby a beamformer may control a phase and relative amplitude of a signal at each transmitter, in order to create a pattern of constructive and destructive interference in an associated wavefront. In some embodiments, in a receive beamformer, a signal from a plurality of associated antennas antenna may be amplified by a different "weight" whereby different weighting patterns (for example, Dolph-Chebyshev) may be used to achieve desired sensitivity patterns. In some embodiments, beamformers may use a fixed set of weightings and time-delays (or phasings) to combine signals from sensors in array or robots 901*a-m*, using, at least, information about a plurality of locations of robots 901*a-m* location of the sensors in space and the wave directions of interest. In some embodiments beamforming may be adjusted by adjusting the position of the one or more robots 901*a-m*. In some embodiments, a delay-and-sum beamformer may be implemented whereby the plurality of "weights" of the plurality antenna elements may have equal magnitudes. The beamformer may steered to a specified direction only by selecting appropriate phases for each antenna. In other embodiments, adaptive beamforming techniques may generally combine available information with properties of signals actually received by array 901*a-m*, for example, to improve rejection of unwanted signals from other directions. This process may be carried out in, for example, either the time or the frequency domain. In other embodiments, a sound propagation or sonar beamforming configuration may be used.

According to a preferred embodiment of the invention advantages over systems known in the art may include:

- Wireless network service 901 may be deployed quickly whereas prior art requires complex installation and commissioning of wireless base stations.
- Wireless network service 901 may be deployed anywhere. In a preferred embodiment, human mechanical intervention may not be required to deploy remotely.
- Wireless network service 901 may be moved at any time since. In a preferred embodiment, there are no fixed mechanical connections.
- One with ordinary skill in the art can appreciate the use of system 900 in tactical communications situations for first responders, anti-terrorism, and in cases where traffic densification is desired.
- In advanced beamforming configurations both vertical and horizontal beam adjustment is possible. Specifically, in some embodiments the degree of vertical and horizontal beam adjustment may be highly reconfigurable, by, for example, adjusting the pattern of the collaborating team of wireless robots 903*a-m*.
- In some embodiments, more advanced beam shapes may be implemented, since positioning of wireless robots does not need to be coplanar and a positioning may be static or dynamic, for example, by combining land robots, air robots, water robots, subterranean robots, and the like, in a beamforming configuration.

In another embodiment, system 900 may provide wireless services 501 on a perpetual basis. For example, whereby individual wireless robots of team 901*a-m* retire from service to recharge energy source 607. Prior to, for example, individual robot 901*a* retiring, a spare or replacement wireless robot 901*b* may be deployed to take the place and perform function of retiring individual robot 901*a*.

In another embodiment, system 900 may provide wireless jamming services. For example, in cases of law enforcement, anti-terrorism, and military operations where such capability may be desired. In this regard, payload 603 may comprise a plurality of electronic or mechanical jammers to radiate interfering signals towards, for example, an undesired communication infrastructure of a terrorist organization or military enemy by blocking an associated receiver with, for example, highly concentrated energy signals. Such a jammer may be configured to implement noise techniques (for example, spot, sweep, and barrage), repeater techniques, and the like, or any combination thereof. In some embodiments, payload 603 may comprise mechanical jamming techniques to reflect or re-reflect, for example, radar energy back to an undesirable radar (for example, and enemy radar) to produce false target returns on an operator's scope of the undesirable radar. Mechanical jamming techniques may include chaff, corner reflectors, decoys, and the like. In a chaff configuration, different length metallic strips, may be configured on one or more robots 901a-m to reflect different frequencies, so as to create a large area of false returns whereby a real contact would be difficult to detect. In a corner reflector configuration, multiple-sided objects may be configured on one or more robots 901a-m to re-radiate radar energy mostly back toward its source. In a decoy configuration, one or more air-capable robots 901a-m may comprise maneuverable flying objects intended to deceive a radar operator by emulating actual military aircraft whereby they clutter up a target radar with false aerial targets making it easier for a real attacking aircraft to get within weapons range and neutralize the radar, the threat, or the enemy. Corner reflectors may be fitted onto one or more robots 901a-m to make them appear larger than they are, thus furthering the illusion that a decoy robot 901a-m is, for example, an actual aircraft. In some embodiments, decoy robots 901a-m may have a capability to perform electronic jamming or drop chaff. In some embodiments, decoy robots 901a-m may also have a deliberately sacrificial purpose, for example, defenders may fire guided missiles at the decoys, thereby depleting limited stocks of expensive weaponry which might otherwise have been used against genuine high-asset equipment such as real military weaponry such as an aircraft or other high-cost or strategic equipment.

In a preferred embodiment, system 900 may optionally be configured to provide fault tolerance. A method for sparing, and replacement of one or more faulty, or damaged wireless robots of wireless robot team 903a-m.

In some embodiments, system 900 may be configured to perform advanced beamforming or spatial filtering or some other signal processing technique used in sensor arrays for directional signal transmission or reception by combining elements in a phased array in such a way that signals at particular angles experience constructive interference while others experience destructive interference. According to the embodiment, beamforming may be used at both the transmitting and receiving ends in order to achieve spatial selectivity.

In some embodiments, the system may be configured to provide advanced backhaul configurations utilizing external channels 904 including techniques such as power combining, and multiple input multiple output (MIMO) signal processing to multiply the capacity of an associated radio link using multiple transmit and receive antennas to exploit multipath propagation.

Different wireless robots 903a-m may provide different wireless services. This would be including, but not limited to different wireless standards, different wireless frequencies, different wireless power levels, and the like. Given that these may be provided simultaneously, and changed dynamically, provides improved capabilities and services not possible in the prior art.

DETAILED DESCRIPTION OF EXEMPLARY EMBODIMENTS

FIG. 10 is an exemplary embodiment illustrating an application for first responders, according to a preferred embodiment of the invention. In a first step 1001 first responders are called to assist in an area of interest where service is limited or non-existent. The first responders would be equipped with a team of wireless robots 901a-m with capabilities described herein, which, in a next step 1002, may be deployed at or near the area of interest. In a next step, 1003, first responders would also be equipped with an appropriate central point station 505 to which the wireless robots may communicate utilizing external channels. It should be noted that central point station 505 may be fixed, or mobile, such as in an incident command station.

The wireless robots, each being equipped with wireless transceiver 706, such as that shown in FIG. 7, would be capable of, in step 1004, providing wireless network service 501 to the first responders utilizing service channels 502. By virtue of being deployed dynamically, and in close proximity to the area of interest, wireless network service 501 provided by the team of wireless robots 901a-m may have a characteristically high signal to noise ratio, enabling clear transmission with low error rates, and high throughput.

In a next step 1005, devices associated to the first responders may then be able to exchange information wirelessly, including information such as voice, video, position, telemetry, and the like. One skilled in the art may appreciate that a team of wireless robots may provide wireless network service in public frequency bands as well as specialized wireless frequency bands reserved for first responders. One skilled in the art may further appreciate that, in step 1006, such a system may provide specialized and highly secure encryption of first responder's information utilizing the control and communication elements in the wireless robots 801a-m as shown in FIG. 8, and in the central point station 505 as shown in FIG. 5.

FIG. 11 is an exemplary embodiment illustrating an application for a battlefield, according to a preferred embodiment of the invention. According to the embodiment, where, in a first step 1101, military personnel may be operating in a hostile environment, the military personnel would be equipped with a team of wireless robots 901a-m of the capabilities described herein, which could be deployed in the hostile environment, and would further be equipped, in step 1102, with an appropriate central point station 505 to which the wireless robots 901a-m could communicate utilizing external channels 504. Central point station 505 may be fixed or mobile, for example, in a military vehicle.

In a preferred embodiment, in step 1103, the team of wireless robots 901a-m may be configured with capabilities described in FIG. 7, and deployed, in step 1104, in a system configuration tailored to the particular electronic warfare needs of the military unit. In this regard, wireless transceiver 706 of some of the wireless robots 901a-m in the team could be configured, in step 1105, to provide wireless network service 501 via service channels 502 to, for example, friendly units. Wireless transceiver 706 (or payload 603) of other wireless robots 901a-m in the team could be configured to provide jamming signals to hamper enemy units as described previously. In some embodiments, communications would be encrypted in step 1106.

FIG. 12 is an exemplary method illustrating propagation of deployable entities 1201 according to a preferred embodiment of the invention. According to the embodiment, a flexible and easily deployable wireless service 1200 is disclosed. According to the embodiment, teams of wireless robots 1201 (for example robots 901a-m) providing network wireless services 501 may, in many embodiments of the invention, be in motion. One skilled in the art can appreciate that as the team of wireless robots 1201 providing wireless service 501 moves away from central point station 505, there may come a time when acceptable performance of the communication link over external channels 504 cannot be met. In some embodiments a pre-configured threshold is configured to determine acceptable performance, in other embodiment a dynamic threshold is configured based on, for example, environmental factors that may affect the efficacy of the integrity of external services 504 and connection to central point station 505, for example, bandwidth problems, channel conflicts with other external networks, and the like. FIG. 12 illustrates an arrangement whereby wireless network service 1203 may continue to be provided even in the case where the team of wireless robots 1201 providing the wireless service 501 moves, for example, beyond the point where the external channels 504 are able to effectively provide acceptable performance.

As illustrated in FIG. 12, a second team of wireless robots 1202 may be deployed to provide "relay function" 1205. The purpose of relay function 1205 would be to extend the reach of the team of wireless robots 1201 providing the wireless service function 1203 through service channels 502.

The second team of wireless robots 1202 may implement a set of external channels 1204 to communicate with the first team of wireless robots 1201 providing wireless service 501. Additionally, the second team of wireless robots 1202 may implement a set of external channels 1206 to communicate with central point station 505. Further, the second team of wireless robots 1202 may relay information between the first team of wireless robots 1201 providing wireless service 501, and central point station 505. In this regard, one skilled in the art could understand how the first team of wireless robots 1201 providing wireless service 501 may now extend their movement further away from central point station 505.

As disclosed above, the movement of the team of wireless robots 1201 providing wireless service 501 may be extended by the use of one or more teams of wireless robots 1202 providing relay functionality 1205. In order to adequately manage a deployment of the team of wireless robots 1202 providing relay functionality 1205, a method or algorithm illustrated in FIG. 13 may be employed.

In some embodiments, wireless robot arrangement 1200 may be used to provide perpetual service whereby teams 1201 and 1202 maintain service channels 502 active by employing additional teams 1202 as necessary, additional central point stations 505 as necessary, and returning to last known good locations (as discussed earlier) as needed when one or more robots 901a-m go out of range. In some embodiments if one or more robots 901a-m becomes unresponsive (for example, travelled out of range and was unable to return to a last known good location, got taken out of commissions by an unfriendly source, lost power, etc.), a new robot may be requested by team 1201, for example, by requesting one or more robots 901a-m from team 1202 to join team 1201. Similarly, team 1202 may request addition robots (not shown) to be deployed by central station 505.

In some embodiments, at least a portion of robots 901a-m may provide one service (for example, wireless network service) while another portion of robots 901a-m may provide another service (for example, a jamming service). For example, in an anti-terrorism environment, wireless service may be accessible by friendlies, while jamming service may be provided simultaneously to jam enemy equipment.

FIG. 13 is an exemplary method illustrating management of a deployment of a team of wireless robots providing relay functionality. According to the embodiment, in a first step 1301, a team of wireless robots 1201 providing wireless network service 501 may be moving toward a target location. As the team 1201 moves farther from central point station 505 the performance of the communications link being transported over the external channels 504 may begin to degrade. The link performance may be monitored by both the team of wireless robots 1201, and by the central point station 505 to determine whether or not to continue towards a target in step 1302. Monitoring methods known in the art such as bit error rate, signal strength, propagation delay, and the like may be employed.

In step 1303, if the link performance is acceptable, the team of wireless robots 1201 continues towards the target. At the point in time where the link performance becomes unacceptable, the team of wireless robots 1201 providing wireless network service 501 may temporarily move back to the last known location in step 1304, where link performance was acceptable across external channels 504. Methods of determining location known in the art may be employed, including but not limited to global position system, inertial guidance, triangulation, and the like. In some embodiments, a particular robot in team 1201 may be used as a reference point for location, for example, aerial robot 901b.

At the same time, a request may be generated, in step 1305 asking for the deployment of a team of wireless robots 1202 to provide relay functionality 1205, such as in the arrangement shown in FIG. 12. In step 1306, system 1200 may wait (step 1307) until the requested team 1202 is on station, and ready to provide relay functionality 1205.

In a next step 1308, the team of wireless robots 1202 to provide relay functionality 1205 may establish external channels 1206 to communicate with central point station 505. when channels 1206 are established, the team of wireless robots 1201 to provide wireless service 501 may, in step 1309, drop its external channels 504 communicating with central point station 505. It may then, in step 1310, establish external channels 1204 communicating with the team of wireless robots 1202 to provide relay functionality 1205.

In step 1310, when the relay functionality 1205 is established, the team of wireless robots 1201 providing wireless service 501 may then be able to continue its movement toward the target location. In a next step 1311, if the relay functionality 1205 is still connected, the process begins again at step 1302. If not, the process reverts back to step 1308 to re-establish an external channel 1206 to central point station 505. The system configuration at this point resembles that shown in FIG. 12.

In some embodiments, a reconfiguration of one or more robots in team 1201, or team 1202, or both, may be performed based on environmental or other changes to the status of other robots in team 1201, or team 1202, or both. In some embodiments, multiple teams 1202 may be deployed in order to extend reach of team 1201 whereby each team 1202 acts as a relay function to another team 1202. In some embodiment, a 1202 team may establish a new central point station remotely connected to central point stations 505 for extending the reach of team 1201, or for redundancy purposes. In some embodiments, team 1201 and/or team 1202 can each be an individual robot.

The skilled person will be aware of a range of possible modifications of the various embodiments described above. Accordingly, the present invention is defined by the claims and their equivalents.

What is claimed is:

1. A method for propagating services using a plurality of service wireless robots comprising:
   deploying the plurality of service wireless robots, each service wireless robot comprising at least a mechanical framework, a communication module, a control unit, and an energy source;
   connecting, by the communication module, a plurality of wireless connections from the plurality of service wireless robots to a central point station;
   directing, by a control unit, movement of one or more service wireless robots of the plurality of service wireless robots towards a target;
   providing, by the plurality of service robots, wireless network services;
   upon detection, at the communication module, of an unacceptable performance for the connection between at least one of the service wireless robots and the central point station, moving the at least one robots back to a most recent good location; the good location defined as a location with an acceptable connection performance to the central point station;
   requesting, by the communication module, a plurality of relay wireless robots;
   establishing, by the plurality of relay wireless robots, a connection to the central point station;
   establishing, by the plurality of service wireless robots, a connection to at least one of the plurality of relay wireless robots; and,
   continuing movement of the one or more service wireless robots of the plurality of service wireless robots towards the target.

2. The method of claim 1 wherein the plurality of relay wireless robots are made up of a subset of the service wireless robots.

3. The method of claim 1, wherein the plurality of service wireless robots are robots selected from a group consisting of land-based robots, aerial robots, subterranean robots, and water-based robots.

4. The method of claim 1, wherein each of the service wireless robots further comprises a payload.

5. The method of claim 4, wherein the payload is a jamming device.

6. The method of claim 5, wherein the jamming device is an electronic jamming device for jamming electronic communication equipment.

7. The method of claim 5, wherein the jamming device is a mechanical jamming device for reflecting signals.

8. The method of claim 7, wherein the mechanical jamming device is a device selected from a group consisting of chaffs, corner reflectors, and decoys.

9. The method of claim 1, wherein the plurality of service wireless robots are deployed in an array structure to enable beamforming.

10. A system for propagation of services comprising:
    a plurality of service wireless robots comprising, at least:
        a mechanical framework;
        a communication module;
        a control unit; and,
        an energy source;
    wherein the communication module establishes a wireless connection to a central point station;
    wherein the propulsion unit enables movement towards a target;
    wherein the plurality of service robots provide wireless network services;
    wherein the communication module is configured to detect performance of the connection;
    wherein upon the performance of the connection being unacceptable for at least one service wireless robot of the plurality of service wireless robots, the control unit directs the propulsion unit to move the at least one service wireless robot back to a most recent good location; the good location defined as a location with an acceptable connection performance to the central point station;
    wherein upon a request by the service wireless robots to configure a plurality of relay wireless robots:
    the plurality of relay wireless robots each establish a connection to the central point station;
    the plurality of service wireless robots each establish a connection to at least one of the plurality of relay wireless robots; and,
    the control unit continues movement of the one or more service wireless robots of the plurality of service wireless robots towards the target.

11. The system of claim 10 wherein the plurality of relay wireless robots are made up of a subset of the service wireless robots.

12. The system of claim 10, wherein the plurality of service wireless robots are robots selected from a group consisting of land-based robots, aerial robots, subterranean robots, and water-based robots.

13. The system of claim 10, wherein each of the service wireless robots further comprises a payload.

14. The system of claim 13, wherein the payload is a jamming device.

15. The system of claim 14, wherein the jamming device is an electronic jamming device for jamming electronic communication equipment.

16. The system of claim 14, wherein the jamming device is a mechanical jamming device for reflecting signals.

17. The system of claim 16, wherein the mechanical jamming device is a device selected from a group consisting of chaffs, corner reflectors, and decoys.

18. The system of claim 10, wherein the plurality of service wireless robots are deployed in an array structure to enable beamforming.

* * * * *